United States Patent [19]
Artar et al.

[11] 3,788,209
[45] Jan. 29, 1974

[54] SMOKEHOUSE RACK

[75] Inventors: Orhan G. Artar, Evanston, Ill.;
Charles W. Ross, Pittsburgh, Pa.

[73] Assignee: Armour and Company, Chicago, Ill.

[22] Filed: Mar. 11, 1970

[21] Appl. No.: 18,417

[52] U.S. Cl............... 99/349, 99/448, 99/450, 99/467, 211/153
[51] Int. Cl. ............................................ A47j 43/00
[58] Field of Search..... 99/349, 423, 441, 450, 350, 99/449, 427, 426, 384, 358, 351, 109, 448, 467, 473–476; 211/153, 162, 181; 17/44.4; 100/DIG. 10

[56] References Cited
UNITED STATES PATENTS

| | | | |
|---|---|---|---|
| 2,896,527 | 7/1959 | Richman et al.................. | 99/358 X |
| 3,233,281 | 2/1966 | Swift............................... | 99/350 X |
| 2,828,686 | 4/1958 | Nelems............................ | 99/427 |
| 2,897,745 | 8/1959 | Nichols et al.................... | 99/427 X |
| 3,517,606 | 6/1970 | Myles et al. .................... | 211/181 X |

FOREIGN PATENTS OR APPLICATIONS

| | | | |
|---|---|---|---|
| 245,916 | 3/1966 | Austria ............................ | 99/259 |

*Primary Examiner*—Billy J. Wilhite
*Assistant Examiner*—Philip R. Coe
*Attorney, Agent, or Firm*—Carl A. Batz; Frank T. Barber

[57] ABSTRACT

A smokehouse rack providing restrainers to compress the ends of sausages as they are smoked or cooked to reduce tapered ends and provide more uniform slices.

8 Claims, 8 Drawing Figures

PATENTED JAN 29 1974

INVENTORS
ORHAN G. ARTAR
CHARLES W. ROSS

BY Carl C. Baty
ATTY.

PATENTED JAN 29 1974　　3,788,209

INVENTORS
ORHAN G. ARTAR
CHARLES W. ROSS
BY Carl C. Baty
ATTY.

PATENTED JAN 29 1974 3,788,209

INVENTORS
ORHAN G. ARTAR
CHARLES W. ROSS
BY Carl C. Batz
ATTY.

SMOKEHOUSE RACK

BACKGROUND OF THE INVENTION

Modern concepts and designs in the packaging of meat products have accentuated the need for improved techniques in the processing of these products. An area wherein the problem has become increasingly apparent is that of the processing of sausage products which are marketed in a sliced and packaged condition. In such packages, and especially when such packages are of a semi-rigid type, there is an important requirement for slices of uniform diameter and size.

Slices of uniform diameter can be partially provided through the use of sausage casings of predetermined, uniform diameter. Such casings are generally closed first at one end with a clip or other device, filled with a meat emulsion or mixture, and closed at the second end with another clip device. The stuffed casings are further processed by smoking or cooking, after which the processed sausages are chilled, sliced and packaged.

Sausages manfuactured in the manner described have tapered ends whereby the portion of the sausage at each end will be of lesser diameter than the center portion of the same sausage. This taper is acceptable in those sausages which are marketed intact, but the taper is costly and objectionable in sausages which are made for slicing and sale in packaged, sliced configuration, such as bologna, luncheon meats, and the like. In order to insure a packageable and marketable product of the latter variety, the tapered ends are first cut off and the meat therein used as a re-work ingredient in a subsequent batch. However, the amount of re-work allowable in sausage formulations is limited by several factors, with the practical result being that the tapered end pieces are sold at greatly reduced prices. It is therefore highly desirable to reduce the tapered ends of these slicing sausage products as much as possible.

One method of arranging sausages for smoking or cooking has been to hang a number of sausages in a rack whereby the sausages are attached to the rack at the upper end and the lower end of the sausage hangs in a depending position. This type of arrangement is highly unsatisfactory for sausages intended for slicing as it results in considerable taper in the upper end of the sausage due to the dead weight of the sausage mixture, and occasionally results in excess diameter in the lower end of the sausage.

Smoking racks having horizontal supporting shelves have been suggested in order to alleviate the problem of tapered ends, and although the taper produced by hanging the sausages was reduced, the result has not been completely satisfactory.

Other methods and apparatus for reducing the tapered ends of sausages have been suggested which take the general form of individual molds or shapers. These methods and apparatus have not proven satisfactory largely because each sausage must be dealt with individually, thereby compounding the expenses of individual apparatus, individual loading and unloading and individual cleaning.

It is an object of the present invention to provide an improved smokehouse rack for sausages which will reduce the taper at the ends of the sausages.

It is a further object of the present invention to provide an improved smokehouse rack for sausages which will produce sausages having a more uniform diameter throughout most of its length.

A still further object of the present invention is to provide an improved smokehouse rack for sausages in which a plurality of sausages can be processed with a minimum of individual handling.

Other advantages and objects of the present invention will become clear as the specification proceeds.

The present invention provides an improved rack for processing sausage products such as bologna, luncheon meat and the like, wherein the rack has at least one horizontal support means to receive a plurality of sausages in a horizontal position, the rack being further provided with restrainer means at each end of the horizontal support means. The restrainer means abut against and compress the sausages at their end portions, thereby greatly reducing the taper which would otherwise be present at the ends of the sausages and providing sausages of more uniform diameter throughout their length.

Certain embodiments of the invention will be described in more detail by reference to the drawings in which:

FIG. 1 is a partial perspective view of a smokehouse rack showing one embodiment of the invention, FIG. 2 is a side view of the embodiment of FIG. 1, FIG. 3 is a partial plan view of the embodiment of FIG. 1, FIG. 4 is a partial perspective view of another embodiment of the invention, showing the restrainers in both opened and closed positions, and with a horizontal support means partially removed.

With reference to the drawings, a frame 10 is shown, generally comprised of vertical legs 12, side angles 14 with cross-bars 16 extending between the side angles and supported thereon. Preferably a plurality of side angles are vertically spaced apart along legs 12 with corresponding cross-bars placed therebetween forming shelves or tiers.

Figure 4:
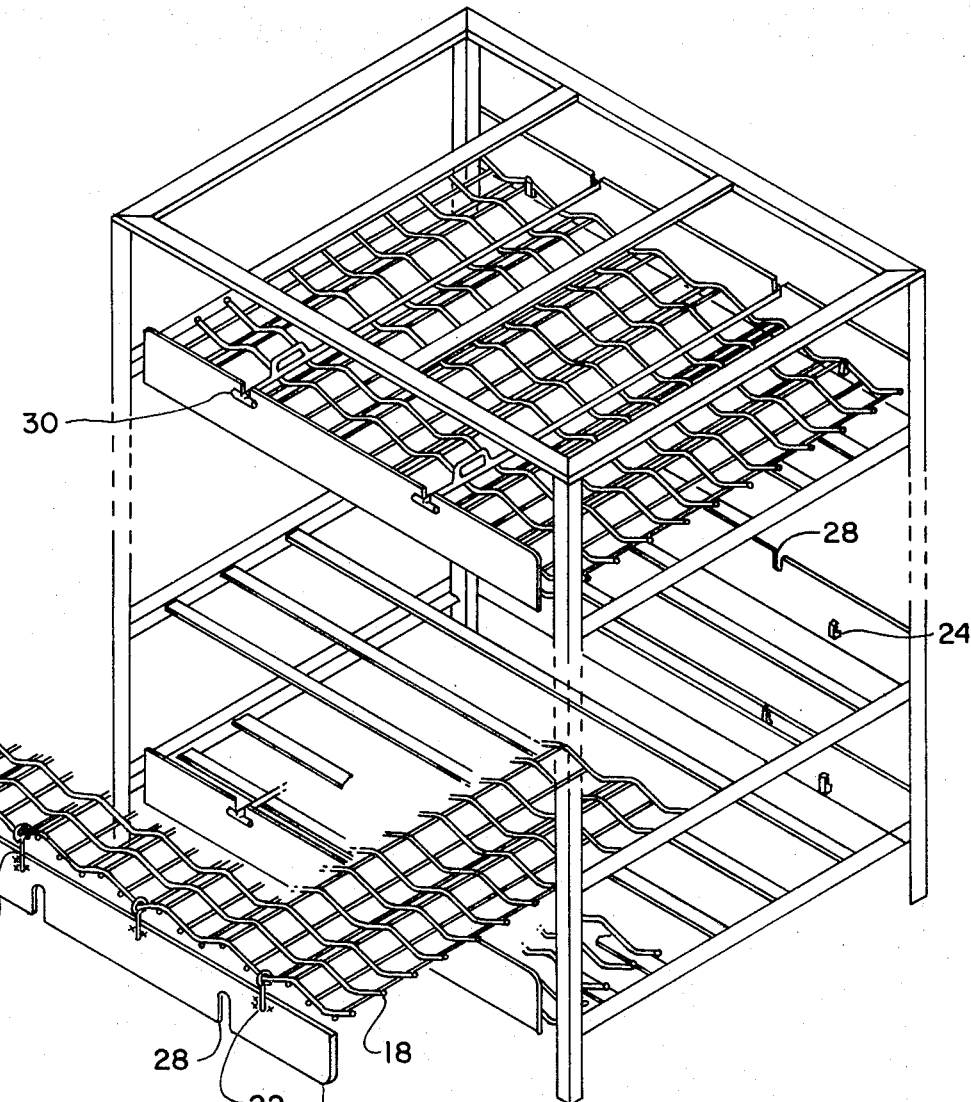
Figure 5:
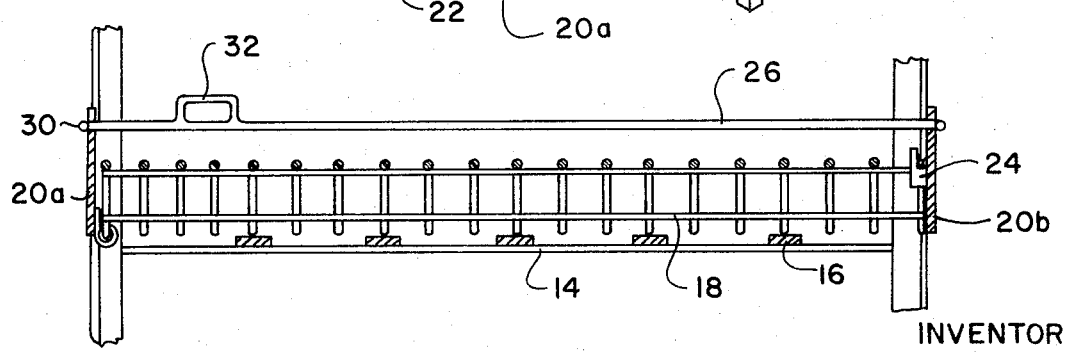
FIG. 5 is a partial side view of the embodiment shown in FIG. 4.
Figure 7:
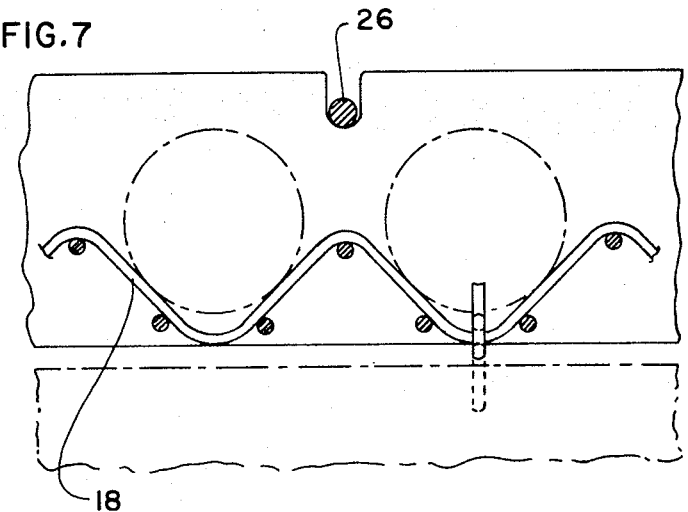
FIG. 7 is a partial end view of the embodiment of FIG. 4.
Figure 8:
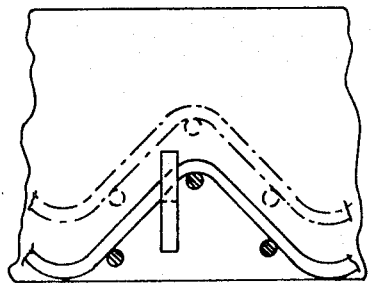
FIG. 8 is a partial end view of the embodiment of FIG. 4 showing the attachment of the horizontal supports to the frame.

Horizontal support means 18 are placed upon cross-bars 16, said support means preferably dimensioned so as to be enclosed within the area defined by the vertical legs 12. Th horizontal support means 18 can be constructed in a variety of ways, but it is preferred that they be of a fenestrated configuration with a vertical cross-section generally defining a series of interconnected V's as shown in FIG. 4. In this manner, a series of elongated ridges and troughs are formed, each trough being dimensioned to receive and support a sausage.

Figure 1:
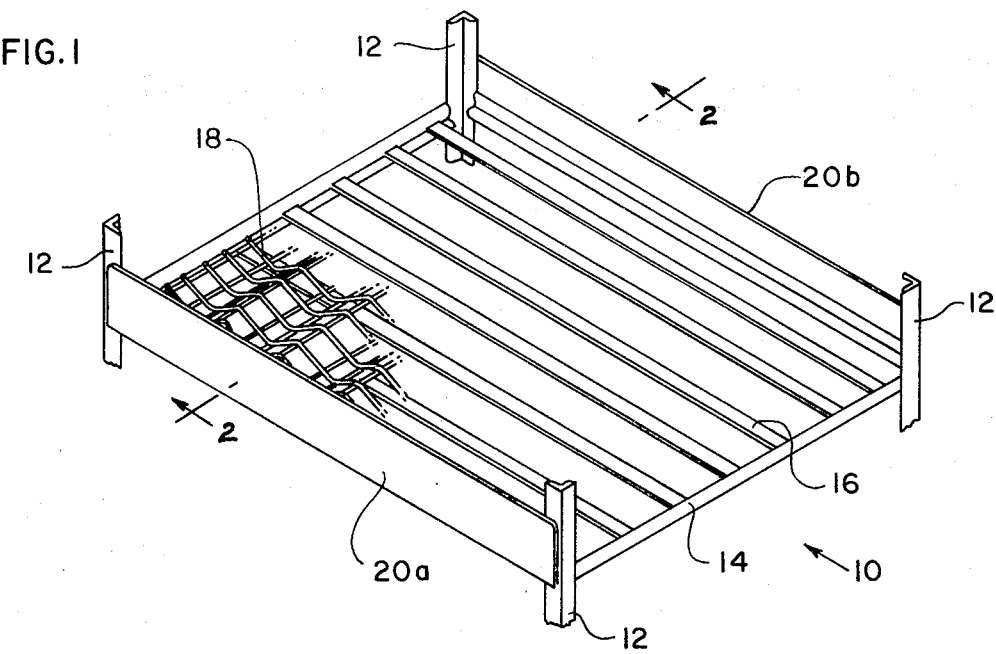
Figure 2:
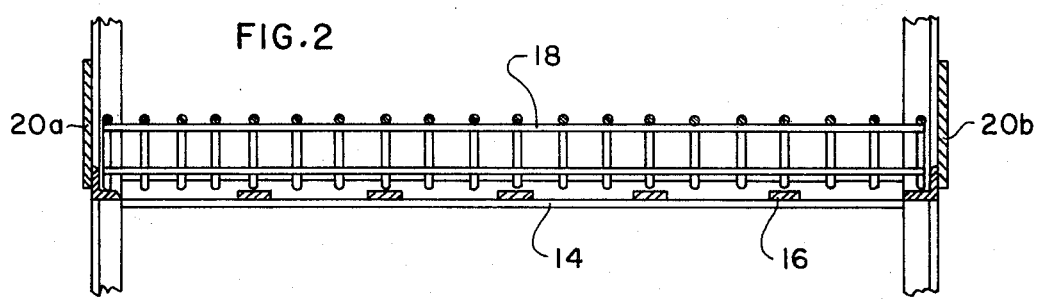
Figure 3:
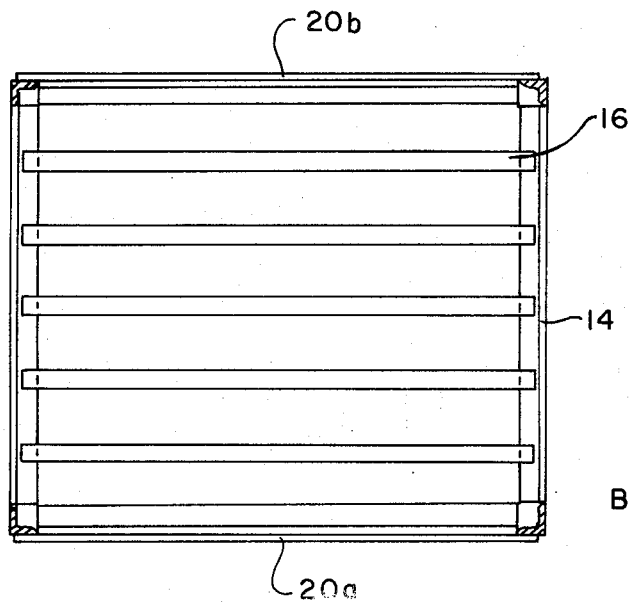
Figure 6:
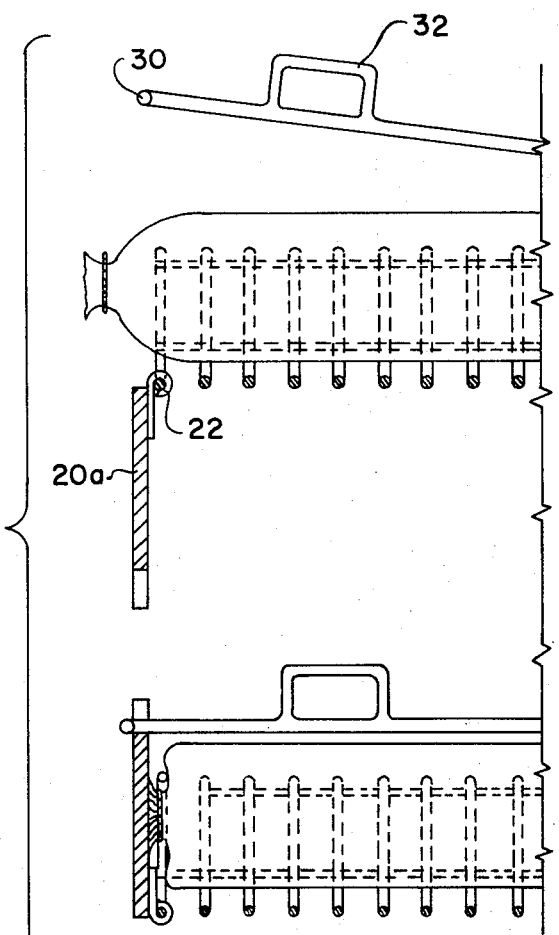
FIG. 6 is a partial side view of the embodiment of FIG. 4 showing the positioning of a sausage in the rack with the restrainers in both opened and closed position.
Figure 6:
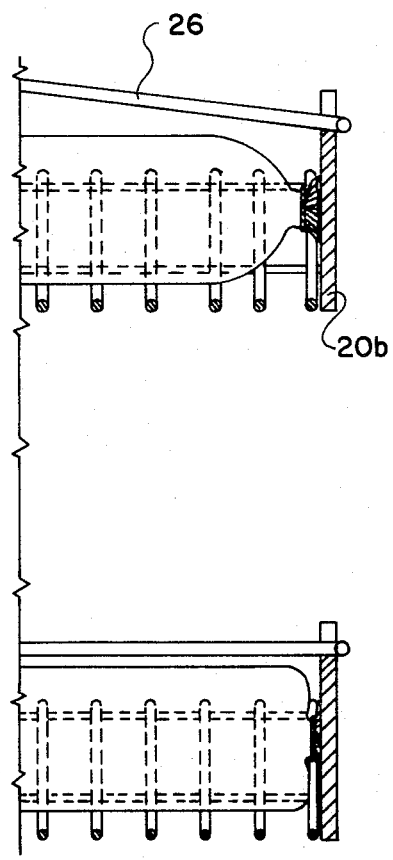

Restrainers 20a and 20b are provided at the front and rear portions of rack 10. Restrainers 20a and 20b are of generally rectangular, flat plate construction and may be mounted to rack 10 by various methods. In the embodiment shown in FIGS. 1–3, restrainers 20a and 20b may be permanently fixed to vertical legs 12 by means of welds or bolts. In the embodiment shown in FIGS. 4–8, restrainer 20a is hingedly mounted to horizontal support means 18 by means of eyes 22, and restrainer 20b is permanently fixed to vertical legs 12 by means of welds or bolts (not shown). Restrainers 20a and 20b are aligned with horizontal support means 18 so that when the restrainers are in the closed position, the bottom edge of the restrainer will be approximately in line with the lower apex of the V-shaped troughs of support means 18. Restrainers 20a and 20b are of sufficient height to extend at least to the longitudinal center line of a sausage placed on support means 18, and are preferably of sufficient height to extend above the top of a sausage placed on support means 18 as shown best in FIG. 6.

As was previously noted, restrainers 20a and 20b can be rigidly fixed to the frame 10, or one or both of the restrainers can be hingedly mounted thereon. We prefer to rigidly fix restrainer 20b to frame 10 and hinge restrainer 20a to support means 18 by means of eyes 22, shown clearly in FIGS. 4 and 5. In this configuration, the portion of frame 10 to which restrainer 20b is fixed becomes the back portion. Preferably support means 18 is placed into frame 10 with restrainer 20a at the side of frame 10 opposite restrainer 20b, said opposite side being referred to as the front portion of frame 10. In this embodiment, hooks 24 are mounted to the interior face of restrainer 20b to engage support means 18 and hold it securely against restrainer 20b.

When restrainer 20a is hinged to support means 18, locking bars 26 are provided to engage restrainers 20a and 20b at cut-away portions 28. Preferably, locking bars 26 are provided with tee portions 30 and handle portions 32. Tee portions 30 are formed at each end of locking bar 26 to hold the bar securely in cut-away portions 28.

OPERATION

In operation, the frame 10 is dimensioned so that the distance between the interior faces of restrainers 20a and 20b is less than the length of the sausages to be processed. Sausage products which are manufactured to be sliced and packaged prior to marketing are generally made to uniform lengths, and the frame is therefore dimensioned to conform to the standard slicing sausage length in a particular plant or location.

The sausage emulsion or meat mixture is stuffed into a standard casing in accordance with techniques known in the sausage making art. The uncooked sausage emulsion or meat mixture is in a semi-fluid state and is somewhat compressable. The sausages are placed in the frame 10 in a horizontal position, supported by support member 18. Because the distance between the interior faces of restrainers 20a and 20b is less than the length of the sausages, each sausage is forced into place between the restrainers, thereby compressing the sausage and flattening the ends. The flattening of the ends of the sausages reduces the initial taper present at the ends of the sausages.

After each of support members 18 has been filled with a plurality of sausages, the entire frame 10 may be transferred to a smokehouse, cooker, or the like for processing the sausages. As the sausages are heated in a smokehouse or cooker, the emulsion or meat mixture expands. In the prior art methods and apparatus, this expansion accentuated the taper at the ends of the sausages, increasing the amount of small diameter end piece which was not useable for slicing. In the present apparatus, the restrainers 20a and 20b prevent lengthwise expansion of the sausages, and instead the expansive forces serve to compress the sausage more firmly against restrainers 20a and 20b insuring the more desirable flat ends.

In the operation of the embodiment of the present apparatus shown in FIGS. 4–8, the apparatus is prepared to receive sausages by inserting support members 18 into frame 10, the support members being supported by cross-bars 16.

The rear portion of support member 18 is engaged by hooks 24 holding the support member securely against restrainer 20b. Restrainer 20a is rotated to the downward or open position.

Sausages to be smoked or cooked are positioned in support means 18, each sausage lying in a trough or valley of the support means. As previously described, frame 10 is dimensioned so that the distance between the interior faces of the restrainers is less than the length of the sausages to be treated. Accordingly, when the sausages are placed on support member 18, the end of the sausage will extend beyond the end of support means 18, as is clearly shown in the upper portion of FIG. 6.

Restrainer 20a is rotated upwardly to a closed position about eyes 22. In order to bring restrainer 20a to a vertical position, pressure must be applied to the ends of the sausages on support means 18. This pressure is received by the sausages as a generally compressive force along the lengthwise axis of the sausage, thereby flattening the ends of the sausages against restrainers 20a and 20b as shown clearly in the lower portion of FIG. 6.

Locking bars 26 are placed into position in cut-away portions 28 with tee-portions 30 on the exterior faces of restrainers 20a and 20b. In this manner, the compressive force of restrainers 20a and 20b is maintained on the sausages, keeping the end portions flattened during subsequent cooking or smoking.

It can be seen that the present invention is especially suited to large scale smoking and cooking of sausage products for slicing in that a plurality of sausages can be quickly handled in the present apparatus. The requirement of placing each individual sausage into some sort of mold has been eliminated. Moreover, the present apparatus has eliminated any requirement for the use of springs and the like for holding a compressive force on the sausages, as the present apparatus utilizes the inherent fluidity and elasticity of the sausage product to generate the necessary compression.

Although the present apparatus is adapted to receiving a plurality of sausages, it is nevertheless capable of rapid loading and unloading, and rapid cleaning. In the embodiment described wherein support means 18 is removeable, it can be seen that this feature allows the rack to be quickly separated into its various components for rapid cleaning. This feature is very desirable in food handling apparatus.

Having described the present apparatus and method in considerable detail of certain preferred embodiments, it will be understood that such description is by way of illustration and that the scope of the invention is defined in the following claims.

We claim:

1. In an apparatus for processing sausage products, said apparatus having a frame and support means carried by said frame for supporting a plurality of sausages aligned with their longitudinal axes in parallel relation, the improvement comprising a pair of parallel spaced restrainer members, one of said members being in abutting relationship with the one ends of said sausages and the other of said members being in abutting relationship with the other ends of said sausages, means for holding said restrainer members in fixed spaced positions in which said restrainers press against the ends of said sausages to flatten said ends, one of said members being hingedly attached to said support means, said holding means being releasable whereby said one member is freed to move about said hinged attachment and so free the ends of said sausages from such pressure brought against them by said members.

2. The apparatus of claim 1 wherein said support means is removeable from said frame when said holding means is released.

3. The apparatus of claim 2 wherein a said one restrainer member is removeable from said frame along with said support means.

4. The apparatus of claim 2 wherein the other of said restrainer members is fixedly secured to said frame.

5. The apparatus of claim 1 wherein the other of said restrainer members is fixedly secured to said frame.

6. The apparatus of claim 1 wherein said one restrainer member is a flat strip and is hingedly connected at its bottom edge with said support means.

7. The apparatus of claim 1 wherein said support means has a surface of fenestrated configuration on which said sausages may rest.

8. The apparatus as set forth in claim 7 wherein said one restrainer member is provided with a recess in its upper edge and said holding means includes a locking bar engaging said recess, said bar being releasable from said recess to release said holding means.

* * * * *